(12) United States Patent
Ramakrishnan

(10) Patent No.: US 7,636,810 B2
(45) Date of Patent: Dec. 22, 2009

(54) METHOD, SYSTEM, AND APPARATUS FOR MEMORY COMPRESSION WITH FLEXIBLE IN-MEMORY CACHE

(75) Inventor: Siva Ramakrishnan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/723,009

(22) Filed: Nov. 26, 2003

(65) Prior Publication Data

US 2005/0114601 A1 May 26, 2005

(51) Int. Cl.
*G06F 12/00* (2006.01)

(52) U.S. Cl. .................. 711/118; 711/129; 711/158; 711/173; 707/1

(58) Field of Classification Search .................. 711/118
See application file for complete search history.

(56) References Cited

U.S. PATENT DOCUMENTS

| | | | | |
|---|---|---|---|---|
| 3,490,005 A * | 1/1970 | Powers et. al. | ............... | 712/241 |
| 5,812,817 A * | 9/1998 | Hovis et al. | ............... | 711/173 |
| 6,044,416 A * | 3/2000 | Hasan | ............... | 710/52 |
| 6,101,581 A * | 8/2000 | Doren et al. | ............... | 711/141 |
| 6,173,381 B1 * | 1/2001 | Dye | ............... | 711/170 |
| 6,202,126 B1 * | 3/2001 | Van Doren et al. | ............... | 711/118 |
| 6,353,871 B1 * | 3/2002 | Benveniste et al. | ............... | 711/3 |
| 6,601,151 B1 * | 7/2003 | Harris | ............... | 711/158 |
| 6,775,751 B2 * | 8/2004 | Tremaine | ............... | 711/154 |
| 6,795,897 B2 * | 9/2004 | Benveniste et al. | ............... | 711/118 |
| 2003/0135694 A1 | 7/2003 | Naffziger et al. | | |

OTHER PUBLICATIONS

PCT International Search Report and Written Opinion from International Application No. PCT/US2004/037824, date of mailing Mar. 31, 2005, 12 pgs.

* cited by examiner

*Primary Examiner*—Christian P Chace
*Assistant Examiner*—Matthew Bradley
(74) *Attorney, Agent, or Firm*—Trop, Pruner & Hu, P.C.

(57) ABSTRACT

In one embodiment, a system includes a main memory including a compression cache to store uncompressed data, where the compression cache is organized as a sectored cache having on-die associated tags. On a tag match to an associated tag, a hit signal is sent to a memory controller coupled to the main memory to schedule an uncompressed data access from the compression cache. A compressed memory may be present to store a plurality of compressed data. Also, a higher priority may be assigned to read operations of the compressed memory in comparison to other operations to the compressed memory. Other embodiments are described and claimed.

25 Claims, 4 Drawing Sheets

Fig.1 In-memory compression architecture

METHOD, SYSTEM, AND APPARATUS FOR MEMORY COMPRESSION WITH FLEXIBLE IN-MEMORY CACHE

BACKGROUND

1. Field

The present disclosure pertains to the field of memory compression. More particularly, the present disclosure pertains to memory compression utilizing an internal cache residing in main memory.

2. Description of Related Art

Memory compression is utilized for reducing large memory requirements, such as, an enterprise server application by compressing data before storing it into memory. Consequently, a reduction in memory costs, power requirements, and server size is achieved.

Some applications using compressed memory data require different amounts of uncompressed data amounts of cache to alleviate latency impacts. However, typical compression architectures are not flexible for accommodating different cache memory sizes required for different applications.

Typically, memory compression may be achieved by utilizing a separate external Dynamic Random Access Memory (DRAM) for storing frequently accessed uncompressed data for alleviating the impact of decompression latency. For example, the DRAM may be placed outside the memory interface through a separate memory address/data path in order to have a large cache. However, this incurs the extra cost for both the pins for connecting to the external cache and the cost of the external DRAM. Furthermore, an increase in design and validation costs arises because of the need to test and validate the external cache and the additional interface and an increase in material costs due to an increase in board size and power requirements.

Another typical solution is embedded DRAM (eDRAM). However, the current eDRAM solutions (4 and 8 MB) are insufficient to handle server applications that utilize at least 32 MB of memory. In addition eDRAM cache increases the cost of the platform.

BRIEF DESCRIPTION OF THE FIGURES

The present invention is illustrated by way of example and not limitation in the Figures of the accompanying drawings.

DETAILED DESCRIPTION

The following description provides method, system and apparatus for a flexible compression architecture utilizing internal cache residing in main memory. In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement appropriate logic circuits without undue experimentation.

As previously described, various problem exist for typical memory compression architectures. In contrast, in one aspect, the claimed subject matter utilizes a main memory for storing compression cache data. In another aspect, the claimed subject matter depicts a flexible compression architecture that may enable expansion of the compression cache by facilitating tag expansion. In yet another aspect, the claimed subject matter depicts a victim buffer and prioritization scheme for alleviating performance impacts by compression and decompression operations.

Figure 1:
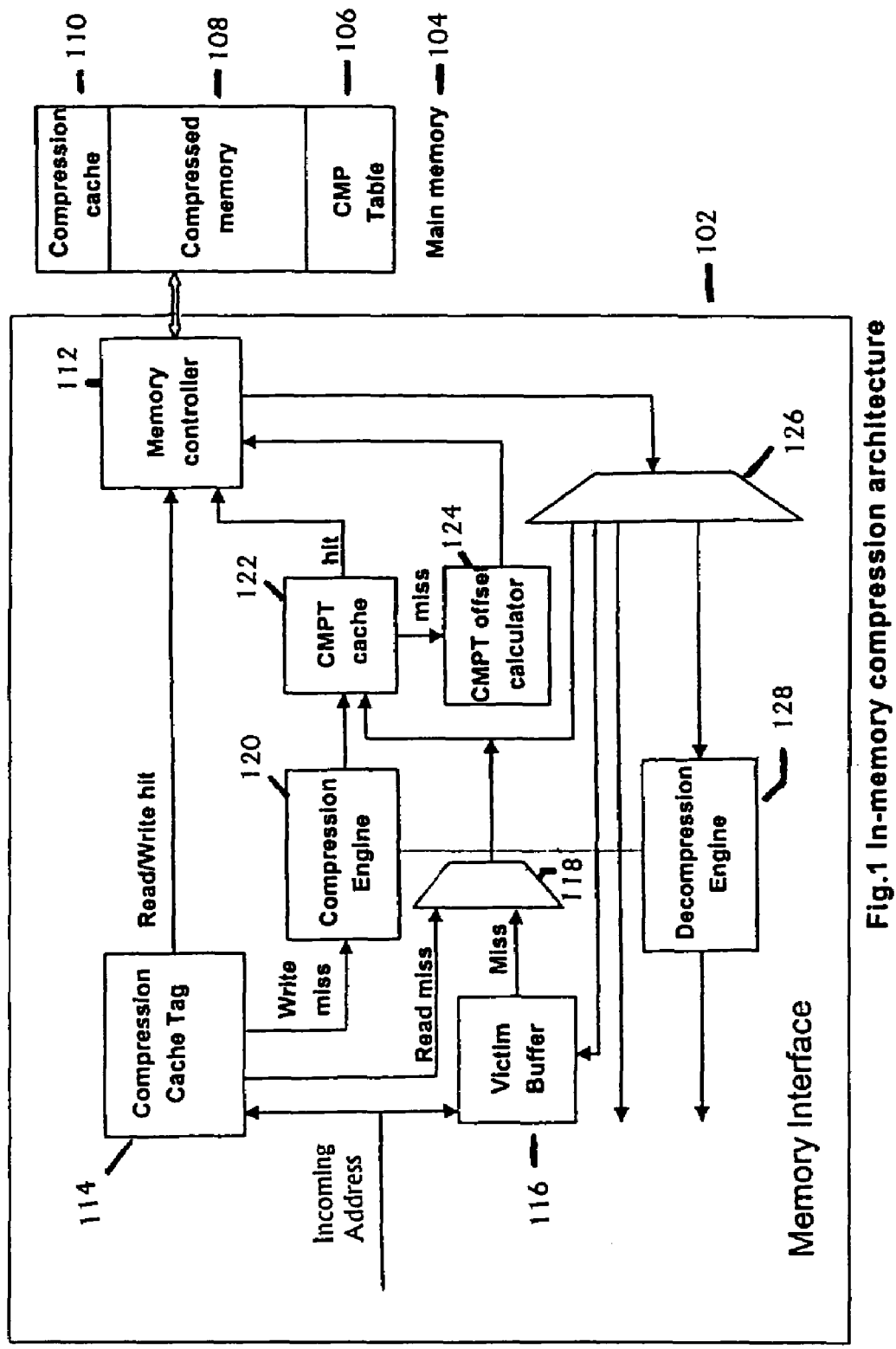
FIG. 1 illustrates an apparatus utilized in accordance with an embodiment

FIG. 1 illustrates an apparatus utilized in accordance with an embodiment. In one aspect and embodiment, the apparatus depicts a novel and flexible memory compression architecture that enables expansion of a compression cache by facilitating tag expansion. In yet another aspect, the apparatus depicts a victim buffer and prioritization scheme for alleviating performance impacts associated of with compression and decompression operations. Furthermore, the apparatus depicts utilizing main memory for storing compression cache data.

The main memory 104 is coupled to a memory interface 102 via a memory controller 112. In one aspect, the main memory 104 stores compression cache data and comprises a compression cache 110, compressed memory 108, and a compressed memory pointer table (CMPT) 106. The compression cache 110 may store the uncompressed data and may be organized as a sectored cache, wherein the associated tags are on-die. For example, on-die refers to the tags being incorporated within an integrated device, such as, a processor or cache memory or any integrated device that utilizes the claimed subject matter. In contrast, the compressed memory 108 may store the compressed data and the CMPT may store the pointers to the compressed data for possible cache block addresses. In one embodiment, the CMPT stores the pointers to the compressed data for all possible cache block addresses.

In one embodiment, the apparatus assigns a higher priority to compressed memory read operations in comparison to other operations, such as, write accesses to compressed memory and other read operations.

The memory interface 102 comprises the compression cache tag 114, the victim buffer 116, CMPT cache 122 and offset calculator 124, and the compression engine and decompression engine 120 and 128, respectively. In one embodiment, the victim buffer stores the entries that have been evicted from the compression cache.

In one embodiment, if data from the compression cache needs to be vacated to store another uncompressed data in its place, the least recently used entry can be vacated. However, the claimed subject matter is not limited to least recently used. For example, other eviction techniques, such as random or round robin may be implemented. In one embodiment, evictions for entries in the victim buffer are First In First Out.

In one embodiment, the CMPT cache stores the most recently accessed CMPT entries. A more detailed description of the apparatus will be discussed in the following paragraphs and pages.

In one embodiment, the apparatus 100 is utilized for compression and decompression functions. For example, the compression cache and victim buffer receive incoming memory addresses wherein a tag match operation is performed. If there is a compression cache hit, a read/write hit signal is enabled and forwarded to the memory controller for scheduling an uncompressed data access in the compression cache 110. Otherwise, in case of compression cache miss, if the access is a hit in the victim buffer, the data is directly supplied to the requester. A more detailed description of a compression cache hit is discussed in paragraph 22.

Otherwise, in the event of a read miss, the pointer to the compressed memory location is obtained either from the CMPT cache 122 or from the CMPT 106 in main memory 104. The CMPT stores the pointer (an address) to the compressed data that is being requested. In one embodiment, it will take one access to get this pointer and then another access to get the actual compressed data, a small cache in the memory interface is used to store the most recently used compressed data pointers. In one embodiment, the CMPT cache is first searched for the pointer. If this cache does not have the pointer, then the pointer is obtained from the main memory itself first. Then the location pointed to by the pointer is accessed subsequently to obtain the actual compressed memory data.

Consequently, the compressed memory location designated by the pointer is accessed and the data is forwarded to the decompression engine 128. Subsequently, the decompressed data is output from the decompression engine 128 and is forwarded to the requester of the initial memory access of the incoming address. Likewise, in one embodiment the decompressed data is subsequently written to the compression engine cache in order to store the most recently accessed memory item in uncompressed form. Before this, a victim data from the compression cache is chosen and vacated to the victim buffer. In the event of a compression cache write miss, the data is compressed by the compression engine and, is stored in the compressed memory location based at least in part on a pointer that may be indicated by a CMPT cache entry. Otherwise, if the pointer is not available in the CMPT cache, then a corresponding CMP table entry in the main memory 104 is accessed by using a CMPT offset calculator 124.

The CMPT (table) stores pointers to compressed data sequentially based on memory address for which the data is compressed. These pointers are of fixed size. In one embodiment, the CMPT offset calculator provides the offset relative to the start of the table based on the actual address of the data being compressed. For example, it may be used in conjuction with the fixed starting address of the table to locate the pointer.

As previously discussed in paragraph 20 for the condition of a compression cache hit, a read/write hit signal is enabled and forwarded to the memory controller for scheduling an uncompressed data access in the compression cache 110. In one embodiment, the data is forwarded to the requester of the initial memory access of the incoming address if the data resides in the victim buffer. Alternatively, the data is forwarded to the requester of the initial memory access of the incoming address if the data resides in the compression cache since the data is uncompressed.

In one embodiment, the latency of compression cache data accesses is identical to an uncompressed regular memory access. In one aspect, the victim buffer may be utilized to alleviate the impact of increased bandwidth demand due to additional memory traffic by storing evicted lines from the compression cache. As previously described, the apparatus assigns a higher priority to compressed memory read operations in comparison to other operations, such as, write accesses to compressed memory and other read operations.

Figure 2:
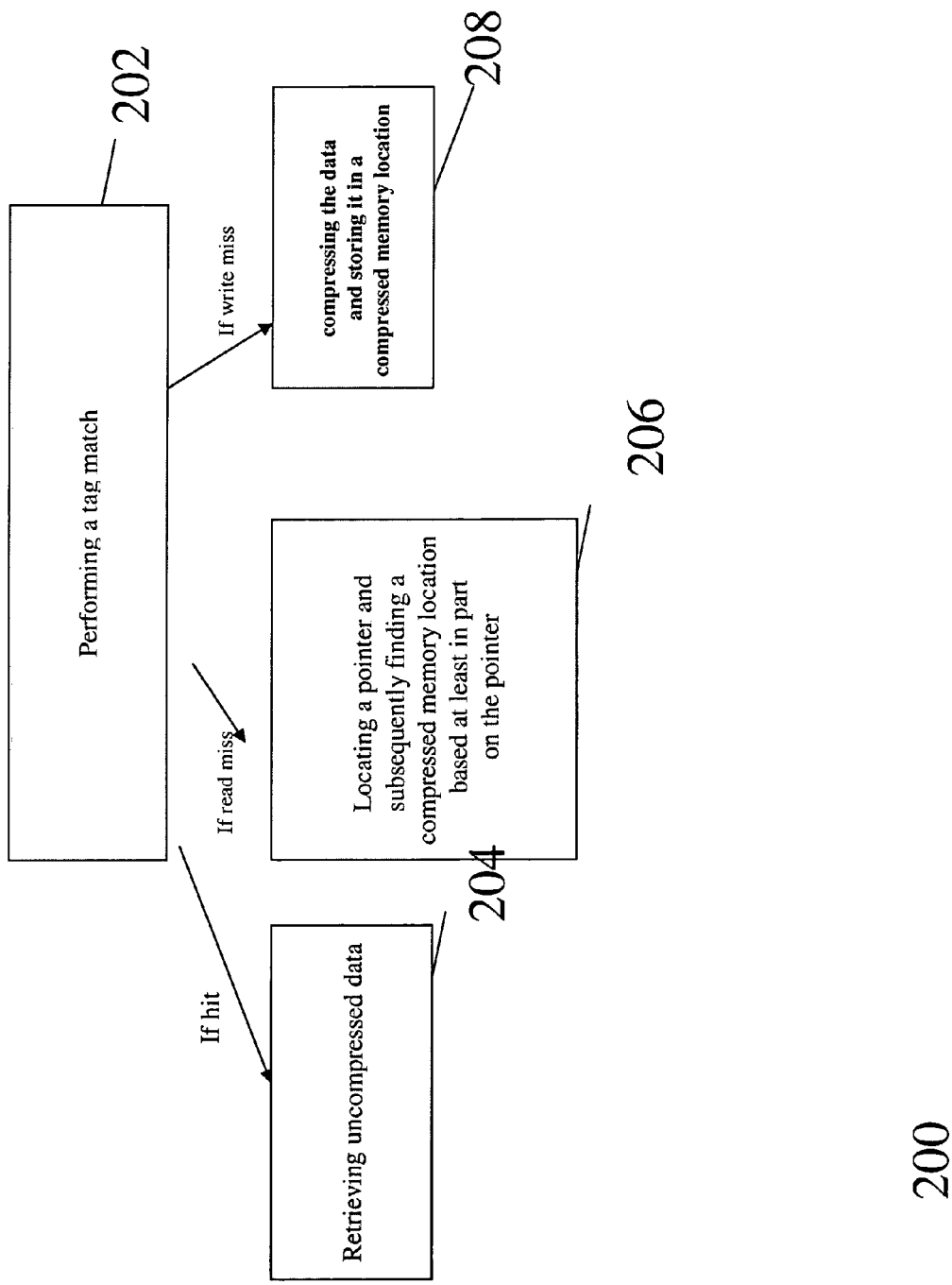
FIG. 2 illustrates a method utilized in accordance with an embodiment.

FIG. 2 depicts a flowchart for a method in accordance with one embodiment. In one aspect, the method depicts a flexible scheme for access to compressed and uncompressed memory. Upon receiving a request for a memory access, a tag match is performed, as depicted by a block 202. In one embodiment, the tag match is performed at a compression cache and a victim buffer.

If the tag match results in a hit, the uncompressed data is retrieved from a compression cache, as depicted by a block 204. Otherwise, for a read miss, the method depicts locating a pointer and subsequently finding a compressed memory location based at least in part on the pointer, as depicted by a block 206. Otherwise, for a write miss, compressing the data by a compression engine and storing it in the compressed memory location based at least in part on a pointer in a CMPT cache entry or based on a CMPT offset calculator, as depicted by a block 208.

Figure 3:
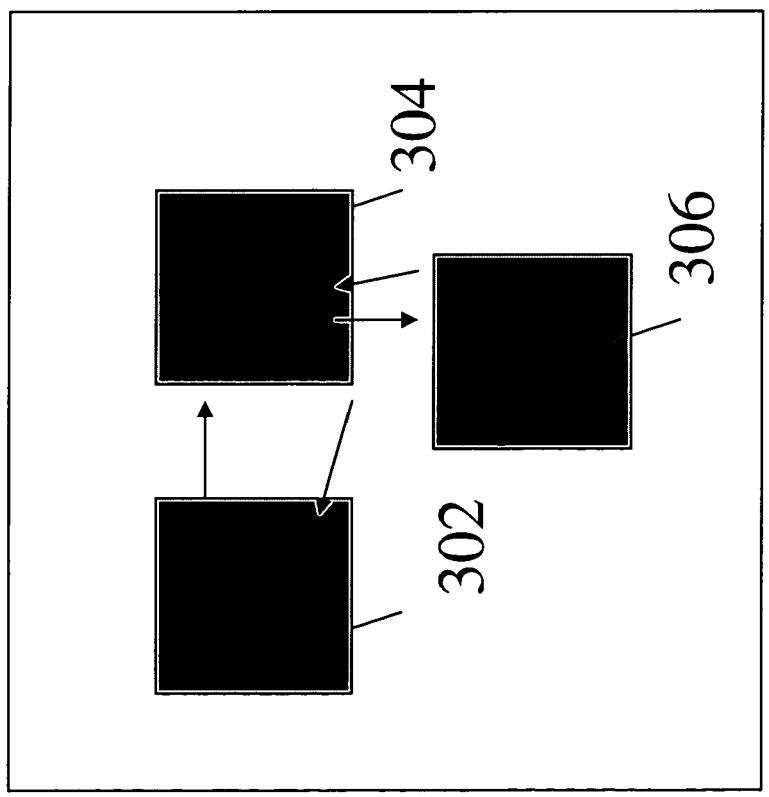
FIG. 3 illustrates a system in accordance with one embodiment.

FIG. 3 depicts a system in accordance with one embodiment. The system in one embodiment is a processor 302 that is coupled to a chipset 304 that is coupled to a memory 306. For example, the chipset performs and facilitates various operations, such as, memory transactions between the processor and memory. In one embodiment, the system comprises one or all of the previous embodiments depicted in connection with FIGS. 1-2 of the specification to allow for a flexibly memory compression architecture. In one embodiment, the memory interface discussed in connection with FIG. 1 may be incorporated within the chipset. Alternatively, in another embodiment, the memory interface discussed in connection with FIG. 1 may be incorporated within the processor.

Figure 4:
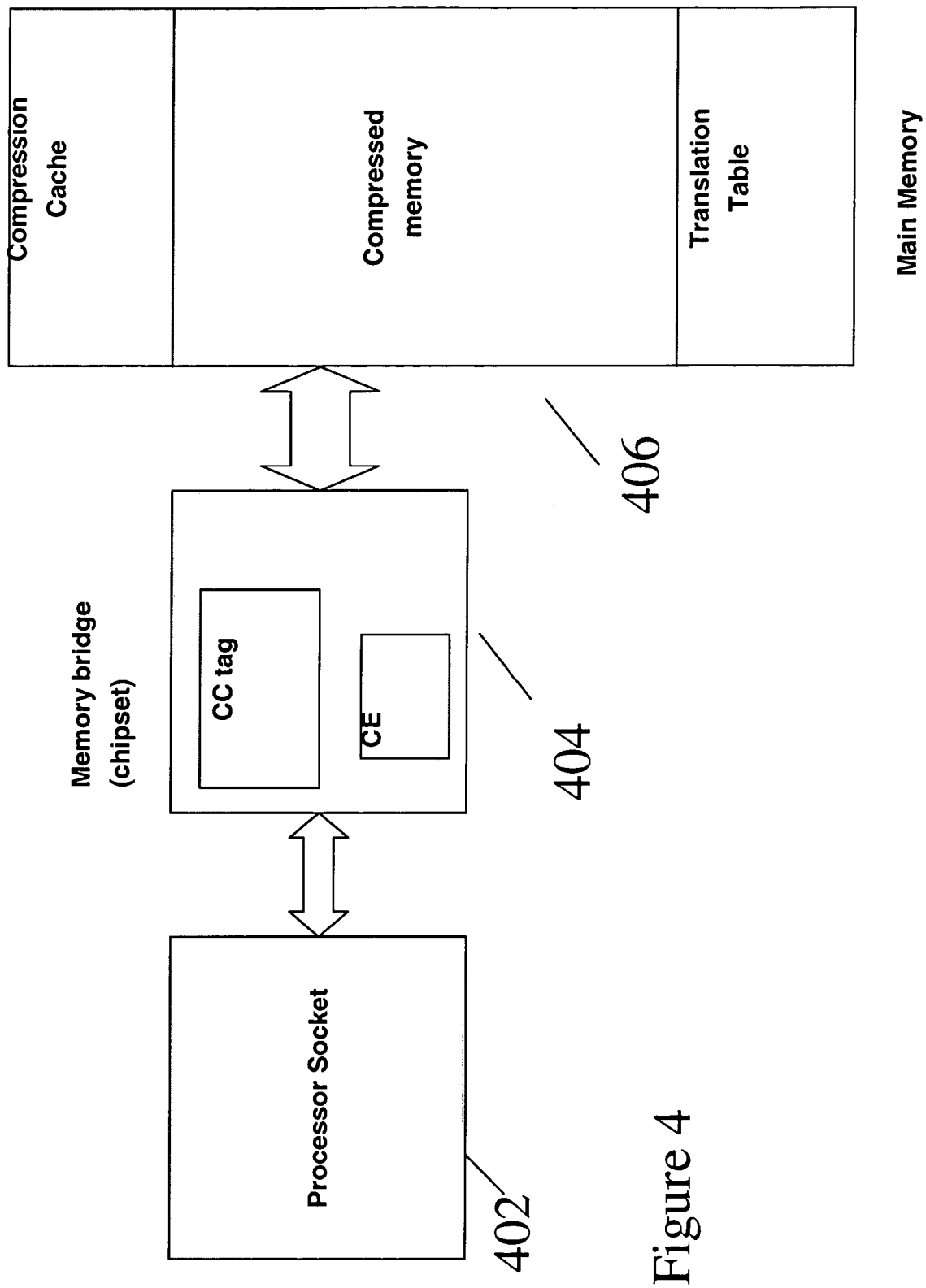
FIG. 4 illustrates a system in accordance with one embodiment.

FIG. 4 depicts a system in accordance with one embodiment. In this embodiment, a processor 402 is coupled to a memory bridge 404, such as, a chipset. The memory bridge incorporates the same logic blocks as memory interface 102 depicted earlier in connection with FIG. 1. Furthermore, the memory bridge is coupled to a main memory, which in this embodiment incorporates the same logic blocks as main memory 104 depicted earlier in connection with FIG. 1.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
    a main memory including:
        a compression cache to store a plurality of uncompressed data, wherein the compression cache is organized as a sectored cache that has associated tags that are on-die, wherein a tag match is performed between a memory access request and the associated tags and a hit signal is sent to a memory controller coupled to the main memory to schedule an uncompressed data access from the compression cache if a hit occurs;
        a compressed memory to store a plurality of compressed data; and
        a compressed memory pointer table (CMPT) to store a plurality of pointers, the apparatus to assign a higher priority to read operations of the compressed memory in comparison to other operations to the compressed memory.

2. The apparatus of claim 1 wherein the compression cache has a plurality of associated tags that are incorporated within a memory interface coupled to the apparatus.

3. The apparatus of claim 2, wherein the memory interface comprises:
    a victim buffer to store at least one entry that has been evicted from the compression cache;

a CMPT offset calculator to provide an offset relative to the start of the CMPT based on an actual address of data to be compressed and stored in the compression cache.

4. The apparatus of claim 3 wherein the memory interface is incorporated within a chipset coupled between a processor and the main memory.

5. The apparatus of claim 4 wherein the apparatus is incorporated within a memory controller hub (MCH) of the chipset.

6. The apparatus of claim 3 wherein the entry is to be evicted based on a first in first out (FIFO) protocol.

7. The apparatus of claim 1 wherein the plurality of pointers are to access the plurality of compressed data based on a plurality of cache block addresses.

8. The apparatus of claim 1 wherein the CMPT is to store the plurality of pointers to the plurality of compressed data sequentially based on memory addresses for the plurality of compressed data.

9. An apparatus for a memory interface comprising:
the memory interface including:
a first cache to store a plurality of tags for a compression cache of a main memory coupled to the memory interface, the compression cache to store a plurality of uncompressed data;
a victim buffer to store at least one entry that has been evicted from the compression cache and to directly supply the at least one entry to a requester if a tag match occurs in the victim buffer;
an offset calculator to provide an offset relative to the start for a Compressed Memory Pointer Table (CMPT) of the main memory that is to store pointers to compressed data stored in a compressed memory of the main memory, based on an actual address of a data being compressed; and
a second cache to store a plurality of pointers for the CMPT, the apparatus to assign a higher priority to read operations of the compressed memory in comparison to other operations to the compressed memory.

10. The apparatus of claim 9 wherein the memory interface is incorporated within a chipset coupled between a processor and the main memory.

11. The apparatus of claim 10 wherein the apparatus is incorporated within a memory controller hub (MCH) of the chipset.

12. The apparatus of claim 9 wherein the entry is evicted based on a first in first out (FIFO) protocol.

13. A method comprising:
receiving a memory address for a memory operation;
storing a plurality of compressed data in a compressed memory in a main memory;
performing a tag match between the memory address and a first cache of a memory interface coupled to the main memory storing a plurality of tags for a compression cache in the main memory; and
accessing a plurality of uncompressed data from the compression cache responsive to an uncompressed access scheduling by a memory controller if the tag match resulted in a hit, and if the tag match resulted in a miss, accessing the plurality of uncompressed data directly from a victim buffer of the memory interface that stores uncompressed data evicted from the compressed memory if the plurality of uncompressed data is present in the victim buffer.

14. The method of claim 13 further comprising locating a pointer in a pointer cache of the memory interface if present therein, otherwise using an offset address obtained from an offset calculator of the memory interface to locate the pointer in a pointer table of the main memory and subsequently finding a compressed memory location based at least in part on the pointer if the tag match resulted in a miss for the memory operation for a read miss.

15. The method of claim 13 further comprising compressing the data and storing it in a compressed memory location for the memory operation for a write miss.

16. A system comprising:
a processor; and
a main memory, coupled to the processor, with:
a compression cache to store a plurality of uncompressed data, wherein the compression cache is organized as a sectored cache that has associated tags that are on-die, wherein a tag match is performed between a memory access request and the associated tags and a hit signal is sent to a memory controller coupled to the main memory to schedule an uncompressed data access from the compression cache if a hit occurs;
a compressed memory to store a plurality of compressed data; and
a compressed memory pointer table (CMPT) to store a plurality of pointers, and to assign a higher priority to read operations of the compressed memory in comparison to other operations to the compressed memory.

17. The system of claim 16 wherein the compression cache has a plurality of associated tags that are incorporated within a memory interface.

18. The system of claim 16 wherein the plurality of pointers are to the plurality of compressed data based on a plurality of cache block addresses.

19. A system comprising:
a processor; and
a memory interface, coupled to the processor, with:
a first cache to store a plurality of tags for a compression cache of a main memory coupled to the memory interface, the compression cache to store a plurality of uncompressed data;
a memory controller to schedule an uncompressed data access from the compression cache if a tag match operation between the plurality of tags and an access request results in a hit;
a victim buffer to store at least one entry that has been evicted from the compression cache;
an offset calculator to provide an offset relative to the start of a Compressed Memory Pointer Table (CMPT) of the main memory that is to store pointers to compressed data stored in a compressed memory of the main memory, based on an actual address of a data being compressed; and
a second cache to store a plurality of most recently used pointers for the CMPT.

20. The system of claim 19 wherein the memory interface is incorporated within a chipset coupled between the processor and the main memory.

21. The system of claim 19 wherein the entry is evicted based on a first in first out (FIFO) protocol.

22. A system comprising:
a processor, coupled to a memory bridge, the memory bridge to comprise;
a first cache to store a plurality of tags for a compression cache of a main memory coupled to the memory bridge, the first cache to perform a tag match operation between the plurality of tags and an incoming memory address;
a victim buffer to store at least one entry that has been evicted from the compression cache;

a memory controller to schedule an uncompressed data access from the compression cache if the tag match operation results in a hit;

an offset calculator to provide an offset relative to the start of a Compressed Memory Pointer Table (CMPT) of the main memory that is to store pointers to compressed data stored in a compressed memory of the main memory, based on an actual address of a data that is compressed; and a second cache to store a plurality of pointers for the CMPT address; and the main memory, coupled to the memory bridge, to comprise;

the compression cache to store a plurality of uncompressed data;

a compressed memory to store a plurality of compressed data; and a compressed memory pointer table (CMPT) to store a plurality of pointers.

23. The system of claim 22 wherein the compression cache is a sectored cache.

24. The system of claim 22 wherein the compression cache has a plurality of associated tags that are incorporated within the memory bridge.

25. The system of claim 22 wherein the plurality of pointers are to the plurality of compressed data based on a plurality of cache block addresses.

* * * * *

UNITED STATES PATENT AND TRADEMARK OFFICE
CERTIFICATE OF CORRECTION

PATENT NO. : 7,636,810 B2  Page 1 of 1
APPLICATION NO. : 10/723009
DATED : December 22, 2009
INVENTOR(S) : Siva Ramakrishnan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 238 days.

Signed and Sealed this

Twenty-first Day of December, 2010

David J. Kappos
*Director of the United States Patent and Trademark Office*